(12) United States Patent
Chaug

(10) Patent No.: US 6,885,518 B1
(45) Date of Patent: Apr. 26, 2005

(54) METHOD AND APPARATUS FOR SECURING A THIN FILM MAGNETIC TAPE HEAD CLOSURE USING GLUING VIAS

(75) Inventor: Yi-Shung Chaug, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 1180 days.

(21) Appl. No.: 09/310,800

(22) Filed: May 12, 1999

Related U.S. Application Data

(62) Division of application No. 08/846,864, filed on May 1, 1997, now Pat. No. 5,943,196.

(51) Int. Cl.⁷ .................................................. G11B 5/29
(52) U.S. Cl. ...................................................... 360/121
(58) Field of Search .............................. 360/121, 126, 360/127; 29/603.21

(56) References Cited

U.S. PATENT DOCUMENTS

| | | | |
|---|---|---|---|
| 4,967,299 A | 10/1990 | Katoh et al. ................. 360/121 |
| 5,022,140 A | * | 6/1991 | Tsutaki et al. ............... 361/121 |
| 5,113,299 A | | 5/1992 | Onoe .......................... 360/126 |
| 5,513,057 A | | 4/1996 | Zieren et al. ................ 360/122 |
| 5,539,598 A | | 7/1996 | Denison et al. ............. 360/113 |
| 5,636,433 A | | 6/1997 | Kang ....................... 29/603.21 |
| 5,943,196 A | * | 8/1999 | Chaug ......................... 360/126 |

* cited by examiner

Primary Examiner—Robert S. Tupper
(74) Attorney, Agent, or Firm—Wayne P. Bailey

(57) ABSTRACT

A method and apparatus including gluing vias in the closure surface and/or the recording module surface to increase bonding strength of the closure to the recording module. The surface of the recording module has a nonplanar topography along a gap side surface which creates localized air space in the gap. When adhesive is introduced between the closure and the recording module, the adhesive flows into these air spaces to bond the surfaces. The invention utilizes gluing vias in the surfaces of the closure and/or the recording module to increase flow of the adhesive and improve bonding strength.

17 Claims, 5 Drawing Sheets

METHOD AND APPARATUS FOR SECURING A THIN FILM MAGNETIC TAPE HEAD CLOSURE USING GLUING VIAS

This is a divisional of application Ser. No. 08/846,864 filed on May 1, 1997, now U.S. Pat. No. 5,943,196.

BACKGROUND OF THE INVENTION

1. Field of the Invention

The invention relates to the field of dynamic magnetic information storage and retrieval. More particularly, the invention relates to a magnetic recording head. In still greater particularity, the invention relates to a method and apparatus for securing a closure to a recording module. By way of further characterization, but not by way of limitation thereto, the invention utilizes gluing vias in the closure and or in the recording module to strengthen the bond therebetween.

2. Description of the Related Art

There has been a great demand for increasing the data throughput of magnetic tape transport systems used in conjunction with high-speed digital computers. In order to utilize the high-speed capabilities of these computers, it is necessary to increase the amount of data stored on a magnetic tape and to increase the speed at which the data is written to or retrieved from the magnetic tape media.

To increase the data storage capacity of the tape transport systems, the areal density of the magnetic tape media which stores the data must be increased. Areal density is defined as the number of units of data stored in a unit area of the tape. Areal density is characterized by two attributes: linear density and track density. To increase the areal density of a magnetic tape media, one must increase either or both, the linear density and track density of the magnetic tape.

Track density is defined as the number of data tracks per unit width of magnetic tape. Two characteristics associated with track density are track width, defined as the actual width of an individual data track; and track pitch, defined as the distance from the center of one data track to the center of a neighboring data track. As magnetic tape head size decreases, the track pitch and track width are decreased, thereby increasing track density.

With high track density magnetic recording heads such as in the 36-track system, because the distance between data tracks is reduced, slight imperfections in the heads will have a more significant impact on the performance and/or the quality of the tape heads. Naturally, a small imperfection in a small area will have a greater impact and be more significant than the same small imperfection in a larger area.

In magnetic recording heads, especially magneto-resistive thin-film tape heads, a gap length between a substrate and a closure is one of the critical parameters in determining the recording performance of the tape head. Bonding the closure and the recording module affects the gap which is critical to the performance of the head. When an adhesive is introduced between the recording module and the closure, an insufficient bond will result in a condition known in the art as "gap slip". Gap slip allows shifting of the closure with respect to the recording module and results in significant yield problems in tape head manufacturing. The occurrence of gap slip during head operation would also deteriorate the head recording performance and head life.

The substrate has read and/or write tracks deposited on and extending from a gap side surface of the substrate to form the recording module which has a nonplanar topography due to the deposition of the structured thin film layers. The recording module is bonded to the flat surface on the closure. After bonding the closure and the recording module, the tape head is ground and lapped such that a smooth contoured surface is obtained.

SUMMARY OF THE INVENTION

The invention utilizes gluing vias in the closure surface and/or the recording module surface to increase bonding strength of the closure to the recording module to thereby improve tape head performance and longevity. The tape head of the present invention has a substrate and a closure separated by a gap. The surface of the recording module has a nonplanar topography along a gap side surface which creates localized air space in the gap. When adhesive is introduced between the closure and the recording module, the adhesive flows into these air spaces to bond the surfaces. The invention utilizes gluing vias in the surfaces of the closure and/or the recording module to increase flow of the adhesive between these surfaces and improve bonding strength.

The present invention further relates to a method of making a multi-track tape head for at least one of reading from and writing to a medium. The method comprises the steps of: (1) forming a recording track on a substrate, whereby the substrate has a first nonplanar topography along a gap side surface of the substrate; (2) adding gluing vias on the substrate and/or the closure; (3) machining a C-core on a gap side surface of the closure; and (4) bonding the substrate and the closure together by introducing adhesive into the C-core.

The present invention overcomes the problems associated with gap slip and increases manufacturing yield. The present invention also reduces or eliminates performance problems and reduced head useful life due to gap slip.

BRIEF DESCRIPTION OF THE DRAWINGS

The present invention will be described with reference to the accompanying drawings.

DESCRIPTION OF THE PREFERRED EMBODIMENT

Figure 1:
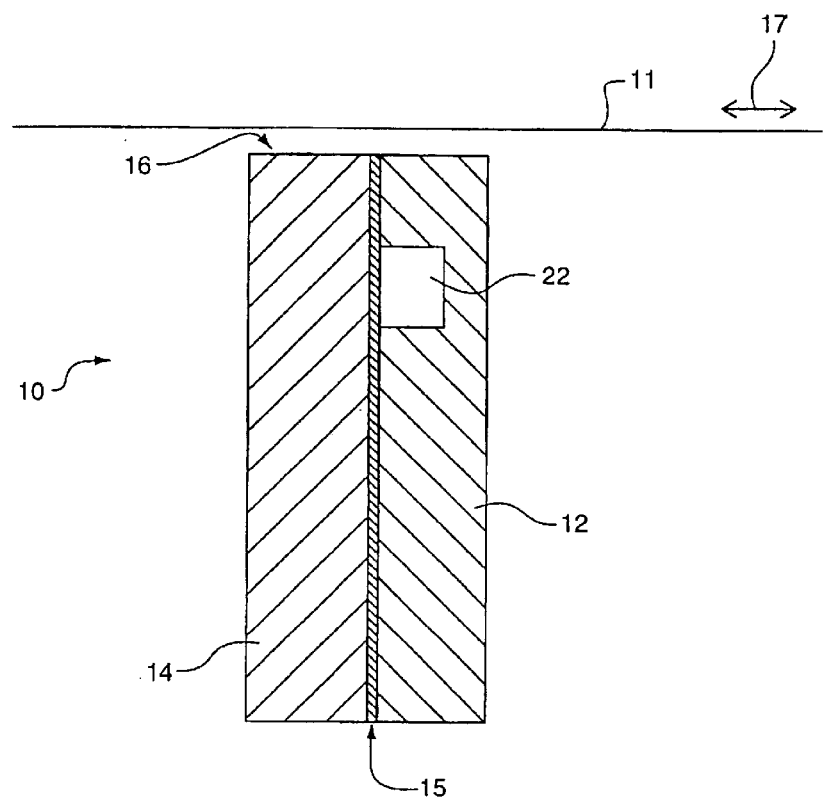
FIG. 1 is a cross-sectional view of the magnetic tape head and medium in accordance with the present invention.
Figure 2:
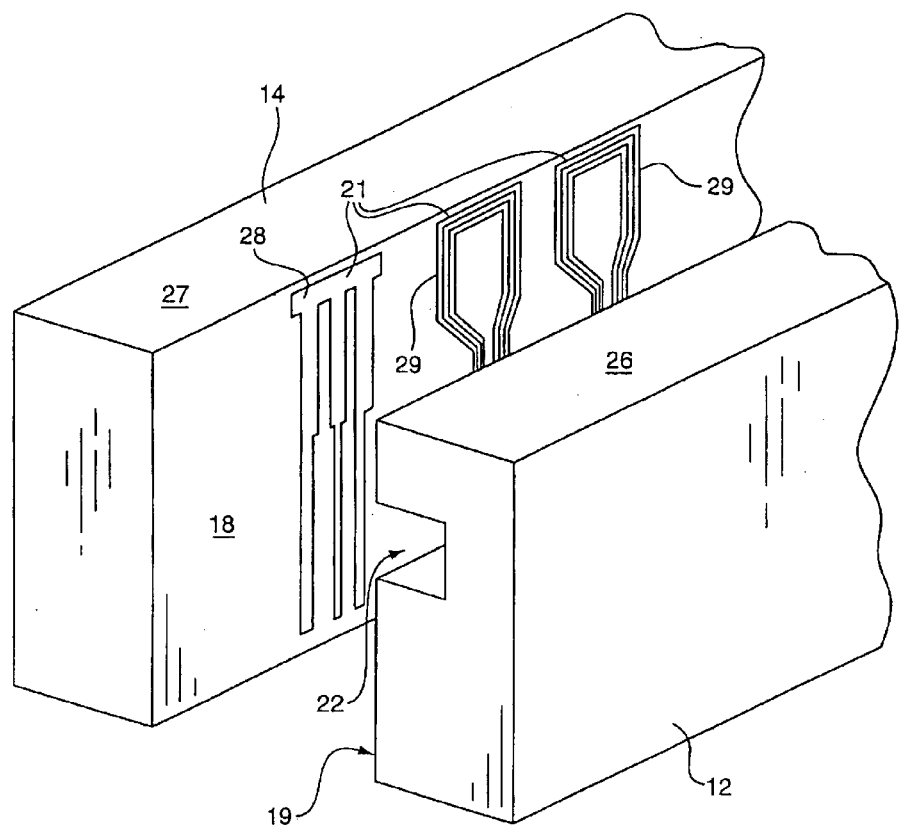
FIG. 2 is an isometric view of the magnetic head of the present invention where the closure is separated from the substrate.
Figure 3:
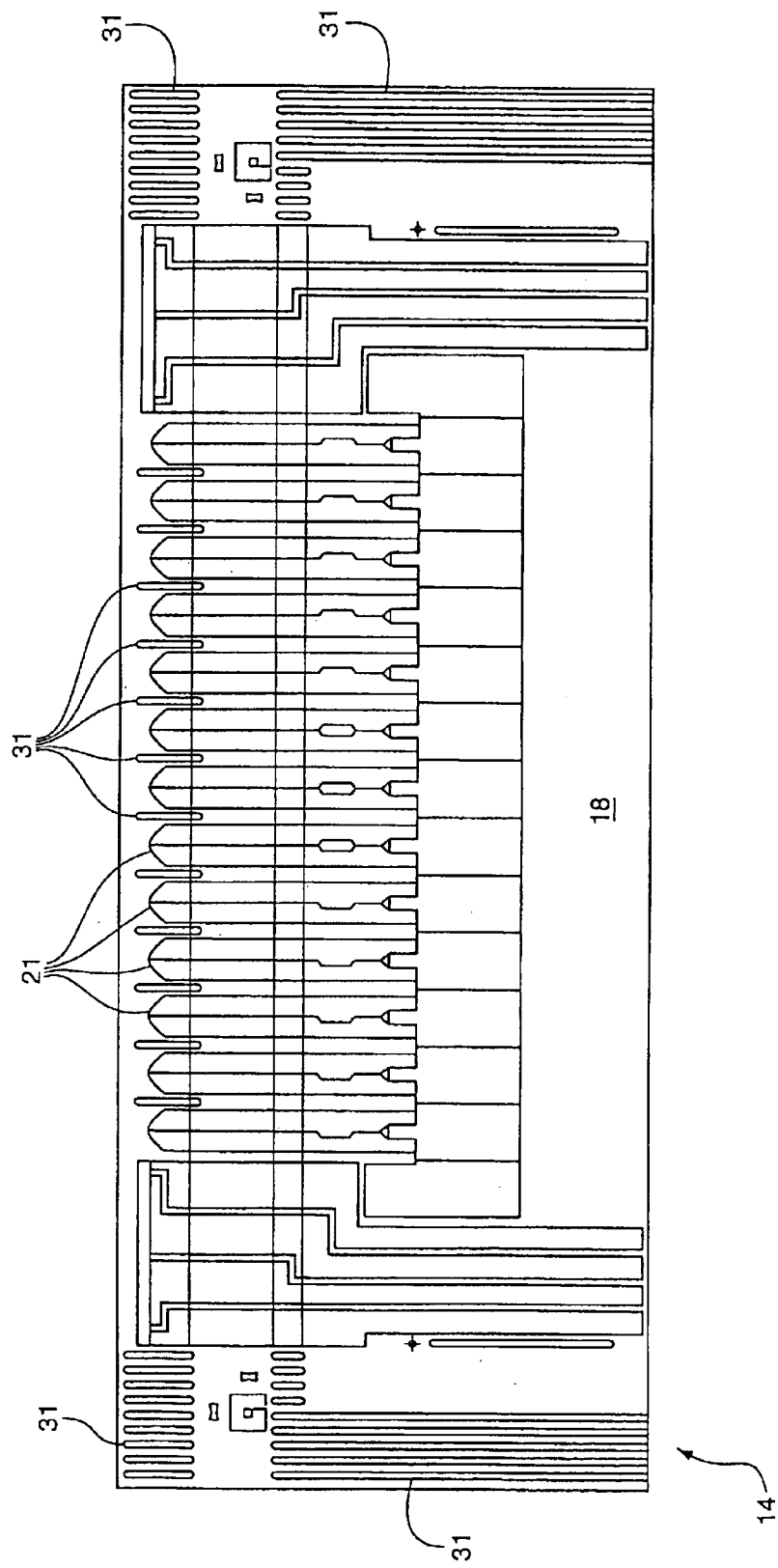
FIG. 3 is a view of side surface 18 of the substrate including gluing vias according to the present invention.
Figure 4:
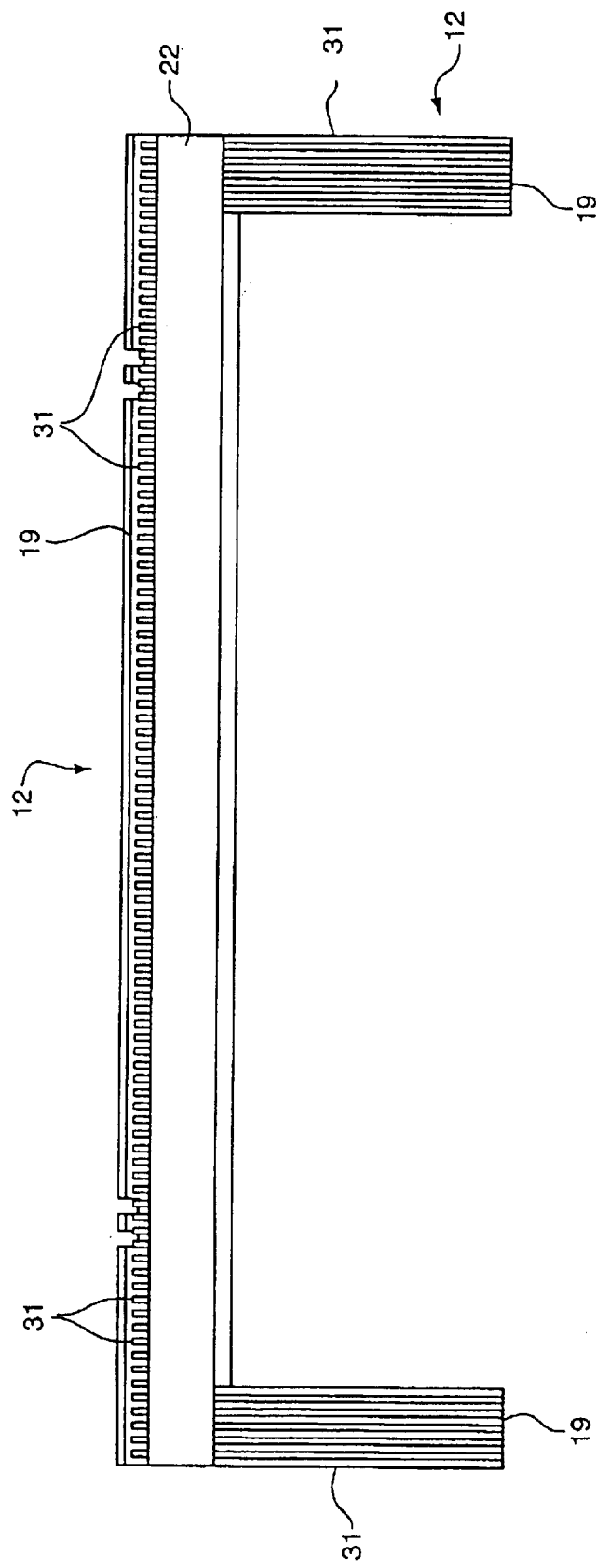
FIG. 4 is a view of side surface 19 of the closure including gluing vias according to the present invention.

The invention relates to a magnetic tape head 10 as shown generally in cross section in FIG. 1. Tape head 10 includes a closure 12 and a substrate 14 separated by a gap 15. A medium such as a magnetic recording medium or a magnetic tape 11 passes over a front end 16 of tape head 10. A magnetic field at front end 16 of gap 15 enables data to be read from and should not be limited to these dimensions or spacing. Of course, it may also be desirable to include vias on both surfaces 18 and 19 to increase bonding strength.

Figure 5:
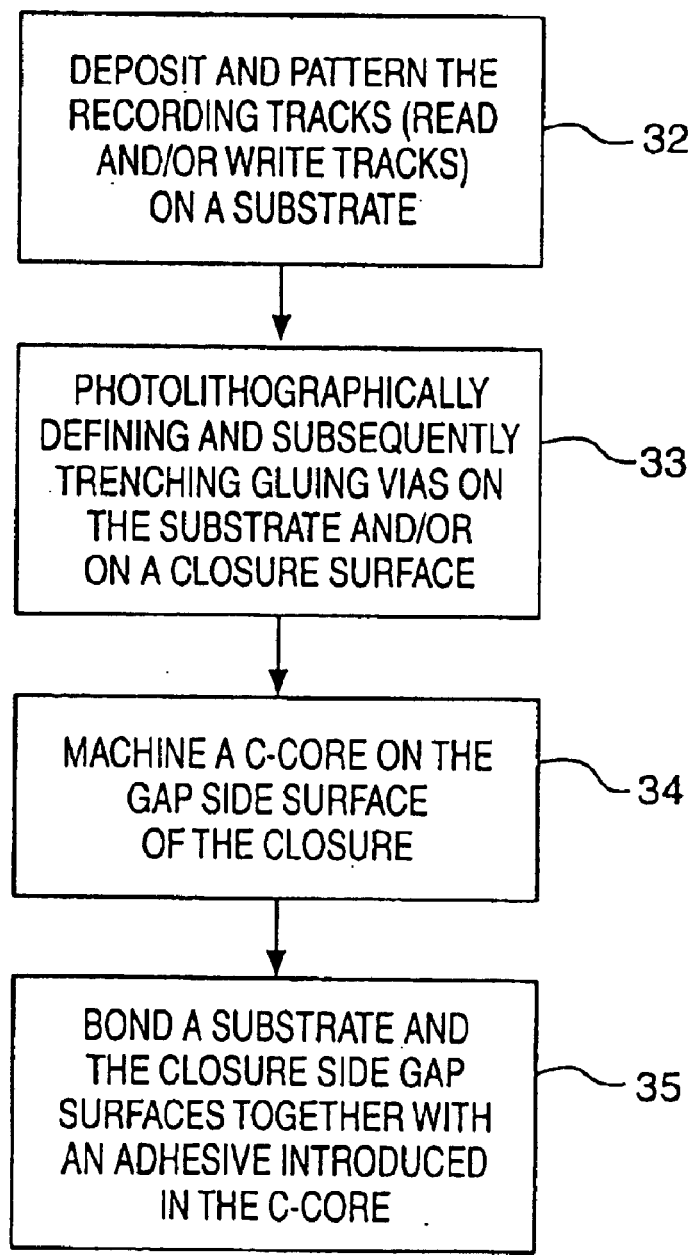
FIG. 5 shows steps for producing a tape head in accordance with the present invention.

FIG. 5 illustrates the steps of manufacturing tape head 10 in accordance with the present invention. In step 32, a recording track layer 16 is deposited and patterned in accordance with conventional thin film deposition techniques such as vacuum deposition to form read tracks 28 and/or write tracks 29. Of course, read tracks 28 and write tracks 29 may be deposited on substrate 14 either before or after closure 12 is manufactured in accordance with the present invention. In step 33, gluing vias are photolithographically defined and subsequently trenched in ether or both the substrate and closure. In step 34, the C-core is machined on the closure surface. Finally, in step 35, the closure and substrate are bonded together with adhesive introduced into the C-core. In accordance with the invention, the adhesive flows into the gluing vias thereby increasing the bond strength of the tape head.

While advantageous embodiments have been chosen to illustrate the invention, it will be understood by those skilled in the art that various changes and modifications can be made therein without departing from the scope of the invention as defined in the appended claims. For example, although tape head 10 has been referred to as a magnetic recording tape head, it is within the scope of the invention to utilize the techniques of the present invention in other types of heads. Similarly, although tape head 10 is of an interleaved type where read tracks 28 are interleaved with write tracks 29, a read tape head having read tracks 28 only or write tracks 29 only may advantageously employ the present invention. Furthermore, although read tracks 28 and write tracks 29 are shown as the type that are deposited on gap side surface 18 of substrate 14, it is within the scope of the invention to have gap side surface 18 configured to receive recessed read tracks or elements 28 and/or write tracks or elements 29. In addition, while certain dimensions and spacing for gluing vias are disclosed in the preferred embodiment, the invention should not be limited to such dimensions and spacing as the claimed method and apparatus may be advantageously employed in many applications as would be apparent to one skilled in the art.

What is claimed is:

1. A multi-recording element magnetic head assembly that is operable for at least one of reading from and writing to a medium moving across the head assembly, comprising:
   a substrate;
   a closure separated from said substrate by a gap, said closure including a C-core;
   a thin film layer deposited on a substantially planar surface of said substrate, said thin film layer comprising a plurality of recording elements operable for at least one of reading from and writing to the medium; and
   a plurality of gluing vias formed between said substrate and said closure and interspersed amongst said plurality of recording elements.

2. The multi-recording element magnetic head assembly according to claim 1, wherein said recording elements comprises at least one of a read element and a write element.

3. The multi-recording element magnetic head assembly according to claim 2, wherein at least one of said gluing vias are trenched on said side surface of said substrate between said at least one of a read element and a write element.

4. The multi-recording element magnetic head assembly according to claim 1 wherein said gluing vias are photolithographically defined and subsequently trenched on said side surfaces.

5. A multi-recording element magnetic tape head assembly that is operable for reading from and writing to a magnetic tape moving across the head, comprising:
   a substrate having a substantially planar gap side surface;
   a closure having a gap side surface that opposes and is separated from said gap side surface of said substrate by a gap;
   a thin film layer deposited on said gap side surface of said substrate in said gap, wherein said thin film layer comprises a plurality of recording elements operable for at least one of reading from and writing to the medium;
   a plurality of gluing vias formed between said substrate and said closure; and
   adhesive in said gap and said gluing vias.

6. The multi-recording element magnetic tape head assembly according to claim 5, wherein said recording layer comprises at least one of a read element and a write element.

7. The multi-recording element magnetic tape head assembly according to claim 6, wherein at least one of said gluing vias are trenched on said side surface of said substrate between said at least one of a read element and a write element.

8. The multi-recording element magnetic tape head assembly according to said claim 5, wherein said gluing vias are photolithographically defined and subsequently trenched on at least one of said gap side surfaces of said substrate and said closure.

9. The multi-recording element magnetic head assembly of claim 1 wherein at least a portion of said plurality of gluing vias intersects said C-core.

10. A multi-recording element magnetic head assembly operable for at least one of reading from and writing to a multi-track medium moving across the head assembly, comprising:
    a plurality of recording elements operable for at least one of reading from and writing to the multi-track medium;
    a core;
    at least one gluing via located between two adjacent recording elements of the plurality of recording elements, said at least one gluing via in contact with, and extending from, said core; and
    an adhesive inserted into said core and said at least one gluing via.

11. The multi-recording element magnetic tape head assembly of claim 5, wherein the plurality of gluing vias are trenched in the closure gap side surface and are absent the substrate gap side surface.

12. The multi-recording element magnetic tape head assembly of claim 5, wherein the plurality of gluing vias are trenched in the substrate gap side surface and are absent the closure gap side surface.

13. The multi-recording element magnetic tape head assembly of claim 5, wherein the plurality of gluing vias are trenched in the substrate gap side surface and the closure gap side surface.

14. The multi-recording element magnetic tape head assembly of claim 5, wherein the plurality of gluing vias are interspersed amongst at least a portion of the plurality of recording elements.

15. The multi-recording element magnetic head assembly of claim 14, wherein at least a portion of the plurality of gluing vias are located between two adjacent recording elements.

16. A multi-recording element magnetic head;
    assembly operable for at least one of reading from and writing to a multi-track medium moving across the head assembly, comprising:
    a plurality of recording elements operable for at least one of reading from and writing to the multi-track medium;

a core;

at least one gluing via located on each of at least two sides of at least one recording element; and an adhesive inserted into said core and said plurality of gluing vias.

17. The multi-recording element magnetic head assembly of claim 16, wherein said plurality of gluing vias are in contact with, and extend from, said core.

* * * * *